INVENTORS
R.C. Heldenbrand, T.M.
BY Sanders & H.J. Schellstede

Dunlap, Laney & Hubbard

ATTORNEYS

United States Patent Office 3,219,397
Patented Nov. 23, 1965

3,219,397
REBUILT TUBULAR JOINT MEMBERS
Russell C. Heldenbrand, Box 178; Thomas M. Sanders, 509 Oak St.; and Herman J. Schellstede, 108 Arthur St., all of New Iberia, La.
Filed Nov. 27, 1961, Ser. No. 155,086
6 Claims. (Cl. 308—4)

This invention relates to improvements in the method of rebuilding or refinishing tubular joint members, and to the rebuilt joint members produced by such method. More particularly, but not by way of limitation, the invention relates to a method for reconstituting the worn outer peripheral portions of drill pipe tool joints.

In certain types of tubular structures, notably those constituting rotating tools used in a confining borehole or the like, the joint portions of such tools are of larger outside diameter than the remainder of the tubular structure. As a result of these relative dimensions, the outer periphery of the joint is subjected to a greater degree of wear through contact with the walls of the confining bore than are the tubular sections interconnected by the joint. Since the joint is very often characterized by an enlarged axial bore which is threaded to permit reception of the end of the adjacent tubular member therein, the wearing away of the outer periphery of the joint eventually reduces the thickness of the metal of the joint to such an extent that the entire tubular structure becomes defective by virtue of the weakness of the joint. In such an eventuality, either the joint portion must be discarded and replaced by a new joint, or else the joint must be rebuilt by adding metal to its outer periphery to replace that which has been worn away. Due to the fact that in many tubular structures the joint portions are formed integrally at the ends of each tubular section, the latter procedure is economically preferable in such structures, since to utilize the former technique would involve replacing practically the entire tubular structure.

A number of joint rebuilding processes are in use at present for rebuilding the joints of tubular structures such as well drilling tools. In the latter structures, each tubular section of the tool usually has an externally threaded male end portion called the "pin," and an internally threaded female end portion called the "box." The interconnected tubular sections are, in such cases, said to be connected by a "pin and box joint." At the box end of each section, both the outside and inside diameter of the tube are enlarged to accommodate the reception of the pin inside the box without alteration of the effective bore size through the joint. The enlargement of the inside diameter is frequently the result of forming the internal threads of the box along a taper extending from the end of the box inwardly at an angle to the axis of the tubular structure. The pin end of each tubular section is also of enlarged outside diameter in order to mate with the external periphery of the box when two sections are joined together. The diametrical enlargements of the pin and box portions of the tubular sections are referred to in the art as "upsets," and the circumferential shoulder formed on each section at the point where the upset begins will hereinafter be referred to as the "upset shoulder." These shoulders may be abrupt, that is, extend radially with respect to the tubular section, or they may be tapered gradually from the upset to the normal outside diameter of the tubular section.

As has been previously explained, the upset portions of such joints, by virtue of their radial protrusion, are subjected to the major portion of the wear encountered during use of such tools in a confining bore. In order to rebuild the upset portions of the joint after they have become excessively worn, a previous practice has been to weld strips of metal around the upsets of the box and pin ends of the tubular sections to increase their outside diameter. After the strips are welded in place, the outer periphery of the joint is machined to roundness. This method of joint rebuilding has several disadvantages, notable among which is the tendency for the superficial metal strips to become disengaged from the joint and thus become ineffectual as wear absorbing surfaces.

The strip welding method of joint rebuilding has, of late, been largely supplanted by a process termed "hardsurfacing." In the hardsurfacing process a bead or layer of wear resistant metal is built up on the periphery of the joint. This is usually accomplished by a welding process termed "submerged arc welding" in which a continuous wire electrode feeds into an arc established between the joint and the electrode. The arc is completely hidden by a granular agglomerated flux to shield it from the air and to add alloy to the deposit of weld material. The heat of the arc melts the electrode, the flux, and the base metal of the work, all of which combine and solidify to form a layer of very hard, wear resistant metal integrated with the base metal.

Although tool joints rebuilt by the submerged arc hardsurfacing process are superior in wear resistance to joints rebuilt by the strip welding process, several difficulties have been experienced in practicing the hardsurfacing technique, and not infrequently some types of joints rebuilt by this process are defective, or become so after a short period of use. For example, great care must be taken in applying the bead of hard weld material to the outer periphery of the upsets of pin and box joints to avoid defacing the abutting ends of adjoining sections by allowing the weld material to be positioned on these faces. It is also undesirable to permit ony of the hardsurfacing material to be welded upon the upset shoulders.

The most frequently occurring defects in joints rebuilt by the hardsurfacing process are those stemming from certain metallurgical phenomena which occur during the application of the weld material to the outer periphery of the joint. The metallurgical defects may be categorized as (a) cracking and/or weakening of the base metal of the joint, and (b) distortion of the threads of the joint so that proper threaded engagement of adjoining tubular sections cannot be attained. Each of these defects is attributable to stresses induced by thermal conditions which arise during the welding procedure.

The tendency for cracks to develop during the hardsurfacing process is most pronounced in low alloy, heat-treated steels, such as the type of which oil well drill pipe is constructed. The so-called "hard cracks" which form in the brittle zone adjacent to the weld, either before or after the welded structure is placed in service, are particularly detrimental in internally threaded joints, since the walls of these joints may be relatively thin adjacent the threads and the crack may extend all the way through to the inside wall. Moreover, the threads of the joint may be adversely affected. The brittle zones where hard cracks develop in the base metal result from the application of the welding heat which causes a quench effect in that portion of the base metal adjacent to the deposited weld metal where the temperature exceeds the critical temperature. If the rate of cooling in this heat-affected zone exceeds the rate of cooling which produces hardening in the base metal, a hard structure known as "martensite" will be formed. It is this hard, nonductile modification of the base metal which is responsible for the formation of hard cracks, particularly those which form before the structure is placed in service.

The rate of cooling in the area adjacent the weld material may be modified by preheating the base metal. Preheating of the base metal at a temperature in excess of 150° F., and particularly at temperatures in the range of 350° F., reduces the distortion of the weld metal and the formation of martensitic and other hard structures. However, the distortion and formation of martensitic structures are effectively prohibited when at least two layers of weld material are applied. The first layer applied, termed the "buildup" layer, cools rather rapidly and some martensite is formed. When the second layer is applied over the first layer, it refines the grain structure of the first layer and surrounding base metal and avoids any hard structural striations.

If the welded structure is heat treated to a temperature of 1000° F. or more, a soft pearlite structure will result. This treatment is not practical for most types of welds. Most welding operations involve the localized application of heat. As a result, extremely steep thermal gradients occur in the region of a weld, with temperature ranges from 3000° F. or more in the weld metal to room temperature in the base metal. As the weld metal cools, it tends to shrink in three planes, subject to the normal laws of metal shrinkage. This shrinkage is restrained in at least one of the three planes by the cold metal surrounding the weld. Accordingly, the weld must deform plastically or otherwise cause distortions in the surrounding metal. In the welding of a heavy plate, the relative mass of a bead of weld metal and the surrounding base metal is so disproportionate that the forces which the weld metal is capable of exerting are not sufficiently great to cause distortion of the base metal. As a result, the weld metal and some of the heated base metal surrounding the weld must deform plastically during the cooling operation. As long as sufficient plasticity exists in this cooling metal, no difficulties are experienced. However, a hard brittle structure such as martensite is not capable of plastic deformation. Therefore, cracks are likely to appear.

The full significance of the hardened, heat-affected zone next to the weld is not fully understood. In its total effect in a given type of base metal it may be harmful, inconsequential, or beneficial. It is known, however, that the steep hardness gradient commonly found in the heat-affected zone of most ferrous metals acts similarly to a notch formed in the metal. Practically all steels are to some extend "notch-sensitive" below a certain temperature and above a certain strain rate. This means that in the presence of a notch or any other structural or metallurgical discontinuity, the steel exhibits a reluctance to flow plastically and absorbs energy in the presence of the notch. Due to its inability to undergo plastic deformation, the steel lacks toughness and ability to withstand impact or shock loading. It is therefore desirable to avoid the propagation of the heat-affected or hardened zone in a notch-sensitive base metal to any greater depth or over any greater area than is necessary.

It is because of the difficulty of shielding or protecting the threads of a joint from the influence of a closely adjacent heat-affected zone that the hard-surfacing technique for rebuilding axially threaded joints has previously been carried out in a manner to avoid placing weld material in the vicinity of the threads. Thus, in joints of the box and pin type, for example, no weld material is applied to the outer periphery of the box in a position radially opposite the internal threads thereof. This has been necessary in order to avoid the development of the hard cracks referred to above, and has also been necessary because the heat-affected zone developed in the base metal by the ordinarily followed submerger arc hardsurfacing procedure extends into the base metal deeply enough to affect the threads by reducing their toughness and ability to withstand impact or shock loading. Since the threads may be very heavily loaded during use of some types of tubular apparatus, such as drilling tools and the like, any such structural weakening of the threads is to be avoided.

On the other hand, inability to rebuild the entire outer periphery of such joints constitutes an obvious disadvantage of the hardsurfacing technique. In the first place, less rebuilt surface is available to absorb the wear acting in the locale of the joint. Moreover, the thinnest portion of the joint, which is that portion carrying the threads, is not rebuilt at all even though it is the portion which is weakest in its worn condition and, therefore, most in need of rebuilding.

The present invention provides a method for rebuilding tubular joint members which allows the entire outer peripheral surface of the joint to be built up by the addition of weld material thereto, even though the joint is characterized by one or more relatively thin, internally threaded portions. The end faces of the joints are protected against the accumulation of weld material thereon, as are the upset shoulders. Certain conditions of heating and cooling are imposed upon the workpiece during the welding process to assure that cracking due to the formation of martensite is kept to a minimum or entirely avoided. This is further accomplished by applying the weld material in such a way that the depth of the heat-affected zone adjacent the weld material is kept to a minimum. Stated differently, the molecular structure adjacent the threads is maintained in its original condition insofar as possible by preventing the advance of the heat-affected zone to a sufficient depth to affect the thread structure.

Broadly, the present invention comprises a method of rebuilding tubular joint members which includes the steps of preheating the joint to a temperature exceeding 150° F. in order to minimize the effect of the three-plane distortion of the weld metal which occurs upon cooling of the weld metal and the consequent development of hard cracks; securing annular protective members to the circumferential upset shoulder and end face at each end of the joint in order to prevent weld material from defacing these portions of the joint; applying weld material of lesser hardness than the base metal to the outer periphery of the joint to increase the thickness of the joint walls; simultaneously with the application of the weld material, cooling the joint under certain specific conditions; and, finally, postheating the joint to a temperature in excess of 850° F. in order to relieve the stresses induced in the base metal by the welding process, and to further prevent the development of the hard cracks to which reference has previously been made. After the joint has been slowly cooled to ambient temperatures following the postheating, the weld material on the outer periphery is machined away to give the desired outside diameter, and the protective annular members secured to the end face and upset shoulder of the joint are removed and the shoulders are then refaced as necessary.

An important aspect of the invention is the utilization of a welding procedure which results in the application of a weld material to the joint which is softer or more ductile than the base metal of the joint. We have found that controlling the ductility of the applied weld material relative to the base metal substantially aids in limiting the formation of cracks or fractures during use of the rebuilt tool joint, particularly when the temperature of the joint is varied during use.

Another important aspect of the invention is the application of a suitable coolant to a strategically located portion of the base metal during the application of the weld metal. This effectively limits the depth of penetration of the heat-affected zone into the base metal to the extent necessary to avoid affecting the threads of the joint.

From the foregoing description it will be apparent that the major object of the present invention is to rebuild tubular joint members by applying at least one layer of weld material to the entire outer periphery of the joint with the weld material extending from one end of the joint to the other.

An additional object of the present invention is to provide a method of rebuilding tubular joint members which avoids defacement by weld material of the circumferential upset shoulder and the end face at the ends of the joint.

A further object of the present invention is to minimize the development of cracks in the base metal of a tubular joint member which has been rebuilt by applying weld material to the outer periphery thereof.

An additional object of the present invention is to provide a relatively simple procedure for rebuilding tubular joint members which, in the rebuilt state, will demonstrate relatively good properties of wear and abrasion resistance.

Other objects and advantages of the present invention will become apparent when the following detailed description of the invention is read conjunctively with a perusal of the accompanying drawings in which.

Figure 1:
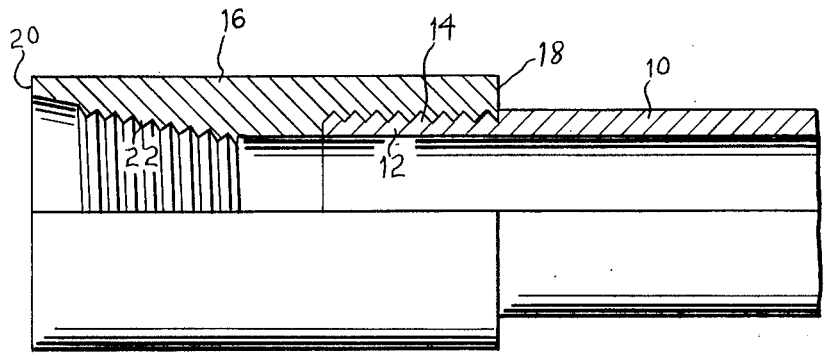
FIGURE 1 is a view, partially in elevation and partially in longitudinal section, of a tool joint of the type in which an internally threaded box member is shrink-fitted on the threaded end of a tubular section of pipe.
Figure 3:
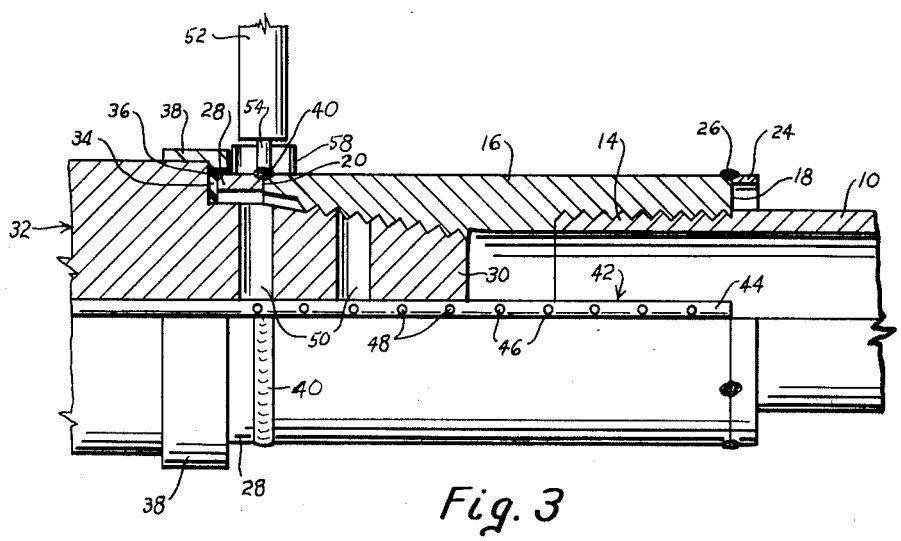

FIGURE 3 is a view of the box of the joint similar to FIG. 1 and, in addition, illustrating the manner in which the mox is threaded upon a mandrel and positioned around an axially extending water supply tube in order to permit the joint to be cooled as the welding proceeds. In addition, FIG. 3 illustrates the manner in which a protective annular member is positioned against the end face of the box in order to protect such face from the accumulation of weld material thereon.

Figure 4:
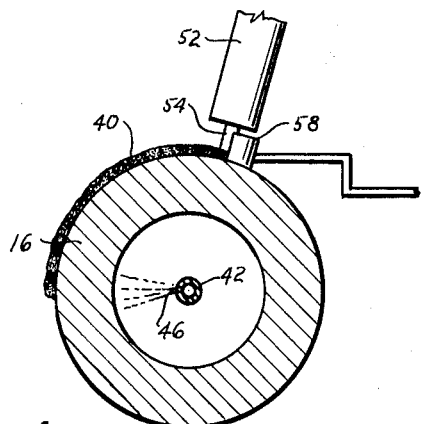

FIGURE 4 is a transverse sectional view through the joint illustrating the position which the welding head assumes with respect to the tubular joint member during the process of applying the weld material.

Figure 5:
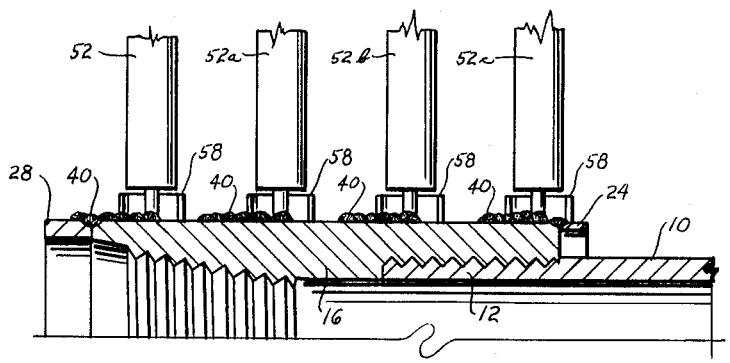

FIGURE 5 illustrates the manner in which a plurality of overlapped helical beads of weld material are applied to the outer periphery by simultaneously utilizing a plurality of welding heads according to a preferred method of practicing the invention.

Figure 6:
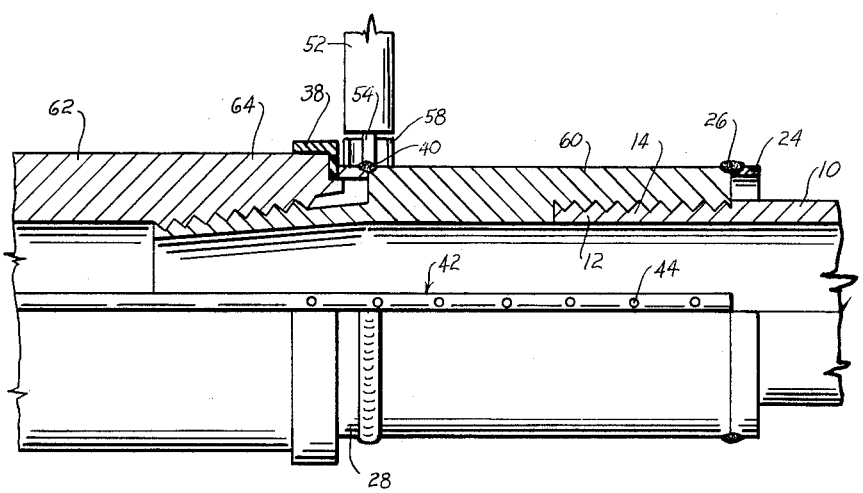

FIGURE 6 is a view similar to FIG. 3 except that a pin member is illustrated instead of the box member shown in FIG. 3.

Referring now to the drawings in detail and particularly to FIG. 1, reference character 10 designates a section of a tubular tool, such as a drill pipe or the like. The ends 12 of the tubular section 10 are threaded, as indicated by reference character 14, and at one end of the section an internally threaded box member 16 is threaded onto the tubular section and is then shrink-fitted thereon for permanent engagement. Since a box and pin type of joint is here illustrated merely for purposes of description and by way of example only, the terms "box," "box member" and "joint member" are considered synonymous as they may hereinafter be used in the following discussion. It will be appreciated by those skilled in the art that a pin member (not seen) is similarly secured to the opposite end of the section 10 so that a plurality of sections of the tubular tool may be interconnected by joining the box and pin members. Such a pin member is illustrated in FIG. 6 of the accompanying drawings. It will also be recognized by those experienced in the pipe fabricating technology that the box member 16 may be secured to the tubular section 10 by other suitable methods, such as by flash welding.

When the box member 16 is secured to the end 12 of the section 10, a circumferential elevator or upset shoulder 18 exists at the inner end of the box member 16, and an end face 20 is located at the opposing end of the box member. Instead of the radially extending upset shoulder 18 illustrated in FIG. 1, in some types of boxes the upset shoulder may be tapered at an angle with respect to the axis of the tubular section 10.

At the open end of the box 16 adjacent the end face 20, the box 16 is internally threaded along a gradual taper as indicated by reference character 22 in FIG. 1. The external threads of the pin member will, of course, be tapered to mate with the tapered threads of the box member 16. The relative outside diameters of the box 16 and the tubular section 10 are such that the outer periphery of the box is further displaced radially from the axis of the tubular joint member than is the outer periphery of the tubular section 10. The outer periphery or upset of the box 16 therefore receives the greatest wear of any portion of the tubular tool, and it is this outer periphery of the box which is to be rebuilt by the process of the present invention.

Figure 2:
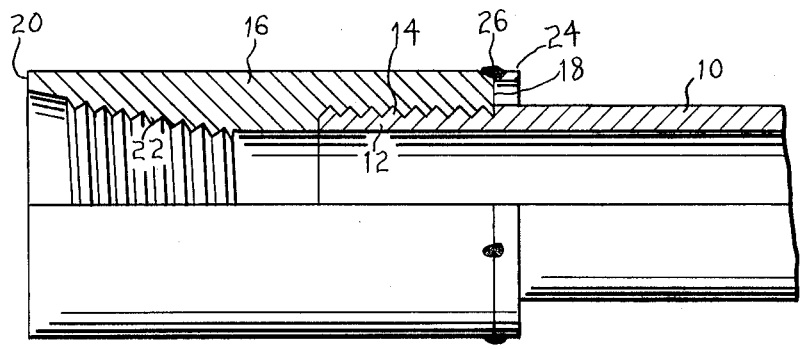
FIGURE 2 is a view similar to FIG. 1 showing the manner in which a split ring is tack-welded to the upset shoulder of the box in the initial step of the process of the present invention.

At the outset of the process, the tool joints to be rebuilt are thoroughly cleaned, both inside and outside, by use of suitable abrasives and solvents. A split ring 24 is then placed around the tubular section 10 and is compressed to approximately the same outside diameter as the outside diameter of the box 16. The split ring 24 is then placed in contact with the upset shoulder 18, and is tack welded in place by means of tack welds 26 circumferentially spaced around the split ring 24 and upset shoulder 18. This relationship is depicted in FIG. 2 of the drawings. Since the split ring 24 will be removed from the upset shoulder 18 by machining later in the process, it is desirable to use as thin metal as possible in the split ring to facilitate such machining. As will be subsequently explained, the purpose of the split ring 24 is to prevent deposition of weld material upon the upset shoulder 18 during the application of the weld material. It should be further noted that although the ends of the split ring 24 need not be in abutting relation to each other, it is desirable to have them located in close proximity to each other in order to avoid the possible leakage of any of the weld material through the space between such ends.

Following the securement of the split ring 24 to the upset shoulder 18, the box 16 is preheated to a temperature sufficient to deter the subsequent formation of martensite in the base metal after the weld material has been applied and during cooling and to minimize hard crack formation due to uneven shrinkage of the weld metal and base metal upon cooling. Although the deterrent action of preheating becomes effective at temperatures in excess of 150° F., we prefer to raise the temperature of the joint to about 400° F. The furnaces which are utilized for preheating the joints should be designed to avoid the formation of carbon deposits thereon. Heating the joint to 400° F. has the additional advantage of causing the joint to approach the welding temperature and thus avoid the tendency toward deformation and distortion when welding is commenced.

After the tubular joint has been preheated to approximately 400° F., a solid metallic ring 28 is slipped over the tapered threaded end 30 of a mandrel 32, and is placed in juxtaposition to a sealing member 34 of resilient material which extends around the mandrel. The sealing member 34 is backed by a radially extending shoulder 36 formed around the mandrel 32. The outside diameter of the annular metallic ring 28 is substantially identical to the outside diameter of the box 16 so that when the box is threaded upon the tapered end 30 of the mandrel 32, the outer peripheries of the ring 28 and the box 16 will be aligned. When the box 16 has been threaded onto the mandrel 32 to the full extent of its threads, the end face 20 of the box bears against the metallic ring 28 and forces it into sealing enagement with the annular sealing member 34. In order to prevent the sealing member 34 from expanding radially under the compression exerted by the ring 28, the mandrel 32 is provided with a metallic seal cap 38 which fits over the shoulder 36 of the mandrel and bears against the sealing member 34 in the manner shown in FIG. 3. This arrangement permits a fluidtight seal to be established between one edge of the annular ring 28 and the sealing member 34.

When the box 16 has been threaded tightly upon the tapered end 30 of the mandrel 32, a bead of weld material 40 is applied in a manner hereinafter described to the abutting edges of the annular metallic ring 28 and the end face 20 of the box 16. A fluidtight connection is thereby established between the ring 28 and the box 16. The purpose of assuring fluidtight connections between the ring 28 and the sealing member 34, as well as between the ring 28 and the end face 20 of the box 16, is to permit a fluid, such as steam or water, to be introduced to the interior of the box 16 for cooling purposes as hereinafter described.

As a means of introducing such fluid to the interior of the box 16, the mandrel 32 is rotatably journaled around a conduit 42 which is connected at one of its ends to a source (not seen) of steam, water, or other suitable coolant. The other end 44 of the conduit 42 occupies a position opposite the upset shoulder 18 of the box 16 when the box is threaded on the mandrel 32. That portion of the conduit 42 which projects into the box 16 beyond the tapered end portion 30 of the mandrel 32 is characterized by a series of perforations 46 which are spaced from each other axially along the conduit. The perforations 46 are positioned in the conduit 42 so that steam or water ejected through the perforations will be directed in a generally horizontal direction. Stated differently, the orientation of the perforations 46 with respect to the box 16 is such that a fluid ejected through the perforations will strike the internal wall of the box along a line lying in the same horizontal plane as the axis of the box.

The portion of the conduit 42 which is disposed inside the end portion 30 of the mandrel 32 is also perforated, and the fluid ejected through these perforations 48 reaches the threaded portion of the box 16 by way of a plurality of ports or orifices 50 formed in the end portion 30 of the mandrel 32. As the mandrel is rotated to rotate the joint threaded thereon as hereinafter described, the orifices 50 become aligned with the perforations 48 at such time as the orifices pass through the horizontal plane containing the axis of the box 16. It will thus be noted that the inner periphery of the box 16 may be subjected to the impingement of a coolant along its entire axial length while the box is threaded upon the mandrel 32 in the manner illustrated in FIG. 3. Escapement of fluid from the inside of the box 16 to the outer periphery thereof is prevented by the engagement between the threads of the mandrel 32 and the box 16 and, additionally, by the fluidtight seals between the metallic ring 28 and the end face 20 of the box 16, as well as between the ring 28 and the sealing member 34.

The method of application of the weld material to the outer periphery of the joint will now be described. The weld material is applied by means of a submerged arc welding process. In this process, a welding head 52 carrying an electrode 54 is placed in spaced relation to the base metal of the joint and a high current electrical arc is established between the base metal and the electrode. A granular flux surrounds the electrode so that the flux covers and completely hides the arc and shields it from the atmosphere. The heat generated by the arc melts the flux, the electrode, and the base metal into a common pool. As the pool cools, the welding material solidifies into a smooth, ripple-free bead 40 while the molten flux floats to the top of the pool and forms a thick slag covering.

Although a single welding head may be utilized in applying welding material by the process of the present invention, we prefer to use two or more of such heads, as illustrated in FIG. 5. In using a plurality of welding heads, the welding cycle begins when the operator lowers one of the electrodes until it touches the work and automatically stops. Flux then flows down around the electrode 54 and covers the point of contact of the electrode with the base metal. When the operator pushes the start button, he applies welding power to the electrode 54, which then retracts slightly to start the arc, and then feeds normally towards the base metal as the electrode is consumed. As previously indicated, the first bead 40 of welding material which is initially applied by the operator will weld the metal ring 28 to the end face 20 of the box 16, thereby sealing in the coolant fluid which is to be injected inside the joint. After the annular bead 40 is applied to weld the metal ring 28 to the end face of the tubular joint and seal off the water which is introduced to the inside of the joint, the first welding head 52 is moved slowly along the box 16 in an axial direction and the box is rotated so that a helical bead 40 of weld material is applied to the outer periphery of the box. Rotation of the box is, of course, accomplished by rotation of the mandrel 32 upon which it is threaded. Simultaneously with the commencement of the formation of the helical bead 40, the injection of a suitable coolant, preferably water, is commenced.

The relative positions of the box 16, welding head 52 (or heads) and water jet are most clearly illustrated in FIG. 4. The welding head 52 is positioned to one side of the vertical axial plane of the tubular joint so that the molten pool solidifies as it passes top dead center. A suitable flux stop or support 58 may be used to prevent flux from sliding down the side of the workpiece.

The injected water is directed against the interior wall of the box 16 along a line which occupies a common horizontal plane with the axis of the joint, and which is spaced more than 90° around the box from the position where the electrode 54 is applied. The purpose of this arrangement is to cool the joint during application of the weld so that the heat-affected area adjoining the weld material is kept to a minimum. The heat-affected area can actually be discerned from the remainder of the base metal by a visible line which separates the two areas and which is called a "heat line." We have found that by adjusting the temperature of the injected water and other welding conditions so that a temperature of 400° F. is maintained in the base metal about one inch behind the advancing end of the helical bead, the heat line is held to a depth of about $\frac{1}{16}$ to $\frac{3}{32}$ inch in the base metal. This is an extremely important feature of the present invention, since it prevents the threads of the joint from becoming notch-sensitive by virtue of advancing in depth by the heat-affected zone of the base metal. Moreover, by applying the coolant at this distance behind the welding head, the possibility of cracking which would exist if the hottest portion of the metal were cooled is avoided.

In a preferred embodiment of the invention, after the injection of water is started and the application of the helical bead 40 with the first welding head 52 is commenced, additional welding heads 52a, 52b and 52c are lowered into proximity to the joint in axially spaced relation along the joint from the first welding head 52. The several welding heads 52, 52a, 52b and 52c are mounted upon a common carriage (not seen) so that all the heads move axially together and their spatial relationship remains constant. This arrangement is shown in FIG. 5.

By employing a suitable ratio of the speed of revolution of the mandrel 32 and its attached tubular joint to the rate of axial movement of the welding heads 52, 52a, 52b and 52c, the helical beads 40 can be slightly overlapped as shown in FIG. 5. This is a desirable technique since it prevents dilution of the weld metal by the base metal, and also prevents the formation of slag pockets. The several welding heads 52, 52a, 52b and 52c are moved axially along the joint until the beads 40 laid down by the following heads reach the beads applied by the leading heads. The following heads are then raised from the workpiece and switched off, while the leading head, designated by reference character 52c in FIG. 5, is used to finish rebuilding the outer periphery of the joint. The split ring 24, which is tack welded to the upset shoulder 18 of the box 16, permits the leading welding head 52c to be moved past the break of the upset shoulder 18 so that the helices of welding material may be evenly extended all the way to the end of the upset or enlarged outside diameter portion of the joint.

In the practice of the invention, one or more layers to weld material may be applied to the outer periphery of the box 16. The number of layers applied will depend upon the anticipated wear of the joint, and upon the desired outside diameter of the rebuilt portion of the joint. As a general rule, the application of a plurality of layers will be more desirable than the application of a single layer, since the former process aids in preventing undesirable hardening of the surface of the joint and prevents the necessity of later annealing. When two layers (or more) of weld material are applied to the joint, the first layer of weld material makes a hard surface layer on the joint, and the second layer of weld material relieves the thermal stresses which have been developed in the first, or surface, layer.

As has been previously discussed, it is very important to the process of the present invention that the hardness of the weld material which is applied to the outer periphery of the joint should not exceed the hardness of the base metal. The relative ductility of the weld material and the base metal is an important consideration in preventing the formation of cracks or fractures in the rebuilt tool joint during subsequent usage. On the other hand, the softness of the weld material will also determine the wear properties of the built-up joint. In the case of drill pipe tool joints, the average hardness of the No. 4137 steel usually utilized in the manufacture of such joints is between 286 and 321 Brinell hardness. In the practice of the present invention, as applied to the rebuilding of drill pipe tool joints, it is therefore desirable to hold the hardness of the weld material which is applied to the joint below 286 Brinell, and we prefer to apply at least one layer of weld material having a hardness of approximately 270 Brinell.

In order to attain the desired hardness in the weld material applied to the outer periphery of the joint, the proper type of electrode and flux and the proper conditions of voltage and current must be utilized when applying the weld material. When using submerged arc welding apparatus of the type manufactured by the Lincoln Electric Co., of Cleveland, Ohio, for rebuilding drill pipe tool joints constructed of No. 4137 steel, an L–60 electrode may be employed, utilizing a voltage of between 27 and 30 volts and an amperage of approximately 300 amperes. The flux material employed is a mixture of equal parts of No. 840 flux and No. H–535 flux, both produced by said Company. The H–535 flux is a high alloy flux containing 1.8% chromium, 0.3% molybdenum, 0.17% vanadium, 1.2% manganese, 0.7% silicon and 0.24% carbon. The No. 840 flux is a non-alloy flux. It is important that the voltage and amperage of the welding arc be held as nearly constant as possible during the welding. A change in the voltage varies the hardness of the weld material by increasing or decreasing the amount of alloy which is obtained from the flux. A change in the amperage, on the other hand, increases the difficulty which will subsequently be encountered in removing accumulated flux material from the weld material after cooling.

After the helical beads of weld material have been applied to the outer periphery of a joint, it is essential that the joint be relieved from the thermal stresses which are induced in the base metal and in the weld metal during the welding process. The joints are therefore removed from the mandrel and are placed in a suitable furnace. The temperature of the joint is then raised to approximately 900° F. and this temperature is maintained for a period of about twenty minutes. If the outside diameter of the joint exceeds six inches, it may be necessary to maintain the elevated temperature slightly longer. Upon completion of the postheating period, the rebuilt joint is placed in a slow cooling bin and is allowed to cool slowly to ambient temperatures over a period of about three and one-half hours.

After the joint has been cooled to ambient temperature, it is placed in a lathe and the outside diameter is machined to a concentricity of the desired outside diameter. The split ring which is tack-welded to the upset shoulder is then machined away and the shoulder refaced. Finally, the metallic ring welded to the end face of the joint is machined away. The end face is machined and polished to the desired dimensions to give a smooth, chatter-free surface. As a final step in the joint rebuilding process, the threads of the joint are cleaned by buffing with a rotary wire brush.

Although the present invention has been described by referring, by way of example, to the application of weld material to the outer periphery of the box portion of a box and pin type joint, it will be apparent that the process is equally applicable to the pin portion of the joint or to other types of tubular joints besides the box and pin type. In FIG. 6 is illustrated the manner in which a pin 60 is rebuilt by applying weld material to the outer periphery thereof. The pin 60 is threadedly secured to a mandrel 62 having an enlarged, internally threaded end portion 64. The remaining elements which are utilized in the assembly of FIG. 6 are the same as those which are employed in rebuilding the box 16 as shown in FIG. 3 and the method of rebuilding the outer periphery of the pin is substantially the same as that hereinbefore described.

From the foregoing description, it will be apparent that the present invention provides a relatively simple process for rebuilding tubular joint members around the outer periphery where the joint has been subjected to excessive wear. By proper control of process conditions, it is possible to avoid the development of cracks and fissures in the base metal as well as in the applied weld material, so that failure of the joint during its subsquent service life is avoided. Moreover, it is now possible to apply the weld material to the outer periphery of the joint in a position which is radially opposite the threads of an internally threaded joint.

Although the process of the invention has been described in considerable detail and specific materials and process conditions have been mentioned, it will be apparent that a wide variation in such described conditions and materials can be withstood without loss of the benefits and advantages derived from the underlying principles of the process as disclosed herein. It is also to be noted that although the invention has been described by referring to a particular type of joint member by way of example, the process is of general utility in rebuilding the outer peripheries of tubular joints, and, insofar as modifications and variations of the steps, conditions, and materials utilized in the process are employed without substantial departure from the fundamental principles of the process, such variations and modifications are considered to be within the scope of the invention as defined by the following claims.

We claim:

1. The method of rebuilding a tubular joint member which comprises:
    securing annular protective members to the circumferential shoulders at each end of the joint to prevent weld material from defacing the shoulders of the joint;
    preheating the joint to a temperature in excess of 150° F.;
    applying a helical bead of weld material to the outer periphery of said joint with said bead commencing at one of said protective annular members and ending at the other of said protective annular members, said weld material being softer than the base metal of the joint;

simultaneously with the application of said weld material, cooling the inner wall of said joint;

postheating the tool joint to relieve stresses induced in the base metal by the welding process;

cooling the joint to ambient temperature over an extended period of time; and then removing said annular protective members and refacing the end shoulders of said joint.

2. The method of rebuilding tubular joint members as claimed in claim 1 wherein said joint is preheated to a temperature of approximately 400° F., and is postheated to a temperature of about 900° F. for a period of about twenty minutes, followed by cooling to ambient temperature over a period of about three and one-half hours.

3. The method of rebuilding tubular joint members as claimed in claim 1 wherein the individual helices of said helical bead are applied in overlapping relation to prevent slag accumulation.

4. The method of rebuilding tubular joint members which comprises:

thoroughly cleaning the joint member;

securing annular protective members to the circumferential shoulders at each end of the joint to prevent weld material from defacing the shoulders of the joint;

preheating the joint member to a temperature of approximately 400° F.;

applying a helical bead of weld material having a lower Brinell hardness than said joint member to the outer periphery of said joint member between said annular protective members;

simultaneously with the application of said weld material, spraying water on the inner wall of said joint along an axially extending line lying in the horizontal plane of the axis of the tubular member to maintain a temperature of approximately 400° F. at a point in said joint located about one inch behind the advancing end of said helical bead as it is being applied;

postheating the tool joint member to a temperature in excess of 850° F. for a period of about twenty minutes to relieve stresses induced in the base metal by the welding process;

cooling the joint member to ambient temperature over a period of about three and one-half hours.

machining the weld material around the outer periphery of the joint member to the desired outside diameter; and then removing said annular proective members and refacing the end shoulders of said joint.

5. In a rebuilt tubular joint member comprising a tubular member having a Brinell hardness of between 280 and 330, and having threads extending axially inward from one end thereof, the improvement which comprises a submerged arc-formed bead of welding material having a Brinell hardness of less than 280 and extending helically from one end of the portion of said tubular member having the largest outside diameter to the other end of said portion.

6. The improvement claimed in claim 5 wherein the transverse width of said bead is of larger dimension than the pitch of said helix so that adjacent individual helices of said helix overlap each other.

References Cited by the Examiner
UNITED STATES PATENTS

| | | | |
|---|---|---|---|
| 1,886,503 | 11/1932 | Shockey | 219—76 X |
| 2,189,595 | 2/1940 | Smith | 219—76 X |
| 2,191,469 | 2/1940 | Hopkins | 219—76 X |
| 2,298,049 | 10/1942 | Gardner | 308—4 |
| 2,427,350 | 9/1947 | Carpenter et al. | 219—76 |
| 2,813,190 | 11/1957 | Felmley, Jr. | 219—76 |
| 3,139,510 | 6/1964 | Marion | 219—76 |

WHITMORE A. WILTZ, *Primary Examiner.*
HYLAND BIZOT, *Examiner.*